United States Patent
Nässen et al.

(10) Patent No.: US 11,505,218 B2
(45) Date of Patent: Nov. 22, 2022

(54) COOLING OF AN ELECTRIC MOTOR

(71) Applicant: BOMBARDIER TRANSPORTATION GMBH, Berlin (DE)

(72) Inventors: Tobias Nässen, Västerås (SE); Erik Bergman, Västerås (SE); Pontus Asplund, Västerås (SE); Shafigh Nategh, Västerås (SE); Johan Lindberg, Västerås (SE)

(73) Assignee: Bombardier Transportation GmbH, Berlin (DE)

( * ) Notice: Subject to any disclaimer, the term of this patent is extended or adjusted under 35 U.S.C. 154(b) by 138 days.

(21) Appl. No.: 16/964,359

(22) PCT Filed: Dec. 14, 2018

(86) PCT No.: PCT/EP2018/085053
§ 371 (c)(1),
(2) Date: Jul. 23, 2020

(87) PCT Pub. No.: WO2019/145091
PCT Pub. Date: Aug. 1, 2019

(65) Prior Publication Data
US 2021/0036576 A1   Feb. 4, 2021

(30) Foreign Application Priority Data
Jan. 26, 2018   (SE) .................... 1850088-4

(51) Int. Cl.
*H02K 5/15*   (2006.01)
*H02K 5/20*   (2006.01)
(Continued)

(52) U.S. Cl.
CPC .............. *B61C 3/00* (2013.01); *H02K 5/15* (2013.01); *H02K 5/207* (2021.01); *H02K 9/06* (2013.01)

(58) Field of Classification Search
CPC ............ H02K 5/15; H02K 5/20; H02K 5/207; H02K 5/24; H02K 9/04; H02K 9/06
See application file for complete search history.

(56) References Cited

U.S. PATENT DOCUMENTS 4,150,313 A    4/1979  Panza
2003/0042805 A1   3/2003  Bates et al.

FOREIGN PATENT DOCUMENTS

| CN | 105634210 A | * | 6/2016 | ............... H02K 1/32 |
| DE | 3147501 A1 |   | 6/1983 | |

(Continued)

OTHER PUBLICATIONS

Ootsuka, machine translation of jp57046645, Mar. 1982 (Year: 1982).*
Machine translation of de29716977, Jan. 1998 (Year: 1998).*

*Primary Examiner* — Eric Johnson
(74) *Attorney, Agent, or Firm* — Dilworth & Barrese, LLP

(57) ABSTRACT

An electric machine comprises a housing (9) enclosing at least a rotor (5) and stator windings (4) of a stator (2) of the machine and comprising an end shield (10, 11) at each axial end of the machine. The housing has an air inlet (15) at a first axial end (12) of the machine and a peripheral air outlet (16) at the other, second axial end (13) of the machine. A fan (17) is arranged in the housing at said second axial end to rotate with the rotor for creating a flow of air through the housing from the air inlet to the air outlet for cooling parts of the electric machine. An air outlet channel (19) conducts air radially leaving the fan to the air outlet (16). This channel has a first channel portion with first walls (21) directing air leaving the fan (17) axially back in the direction of the first axial end (12) and a second channel portion with second walls (23) redirecting the air flow from the fan to assume a major radial component.

16 Claims, 3 Drawing Sheets

(51) Int. Cl.
*H02K 9/06* (2006.01)
*B61C 3/00* (2006.01)

(56) References Cited

FOREIGN PATENT DOCUMENTS

| | | | |
|---|---|---|---|
| DE | 29716977 U1 * | 1/1998 | ............... B61C 3/00 |
| EP | 1047176 A2 | 10/2000 | |
| FR | 834964 A | 12/1938 | |
| JP | S57-46645 A | 3/1982 | |

* cited by examiner

COOLING OF AN ELECTRIC MOTOR

TECHNICAL FIELD OF THE INVENTION AND BACKGROUND ART

The present invention relates to an electric machine comprising a stator having a stator body with a stator winding configured to electrically create a plurality of stator poles disposed around the inner periphery of the stator body, a rotor rotatably disposed within said stator and having a rotor body, a housing enclosing at least said rotor, the stator body and the stator winding and comprising an end shield arranged at each axial end of the machine, said housing having at least one air inlet at a first said axial end of the machine and at least one peripheral air outlet at the other, second axial end of the machine, a fan fixed within the housing at said second axial end to rotate with the rotor body so as to create a flow of air through said housing from said air inlet to said air outlet for cooling parts of the electric machine, and an arrangement configured to form an air outlet channel configured to conduct air radially leaving said fan to said air outlet.

Such an electric machine may operate as motor and/or generator, although this disclosure will focus mainly on the operation thereof as a motor.

The present invention is particularly applicable to electric machines in the form of motors of the type defined in the introduction for creating a traction force of a track-bound vehicle, especially a rail vehicle, and this application of such an electric machine will mainly be discussed below without for that sake restricting the invention thereto. Such a machine may of course function as a generator when braking the vehicle.

An electric machine of this type is cooled by the flow of air created by said fan for being able to operate at a range of power levels when functioning as a motor and deliver a range of power levels in the case of generator function without for that sake causing the temperature of sensitive parts of the machine or surrounding equipment to be so high that these parts, as an example electrical insulating elements of the machine, are destroyed or the function of the machine or parts thereof disturbed.

These types of electric machines having a said fan which rotates with the rotor body are called self-ventilated machines, and the benefit of using this type of motors is that considerable costs may be saved, since there will be no need for an external fan and also ducting equipment from that fan to the electric machine which is the case in a so called forced-ventilated motor (electric machine). However, traction motors with internal fans normally produce aeroacoustic noise in average and high speeds. Considering the noise level on vehicle level and its breakdown to every component, the noise budget for traction motors and drive systems is normally very limited. This has been considered as one of the main reasons to not use self-ventilated motors in railway vehicles in spite of the cost advantage thereof.

U.S. Pat. No. 4,150,313 discloses an electric machine of the type defined in the introduction in which said arrangement conducts the flow of air in an air outlet channel covered by a silencer of a material, such as mineral wool, absorbing noise created by the rotating fan and the air flow created thereby. However, this silencer adds cost to the electric machine and does also occupy a considerable space, which would be of disadvantage when using such an electric machine in a railway vehicle, since that space may otherwise be occupied by other equipment or used to make the electric machine more powerful. Another disadvantage of using a silencer made of materials as mineral wool is dirt accumulation which can result in blockage of outlet that results in higher pressure drop and consequently less motor cooling.

U.S. Pat. No. 5,124,600 discloses an electric machine having a silencer built in into said arrangement forming an air outlet channel, but this silencer includes an expansion chamber and ducting adding a considerable amount of required space in the axial direction of the electric machine.

SUMMARY OF THE INVENTION

The object of the present invention is to provide an electric machine of the type defined in the introduction being improved with respect to such electric machines already known so that it will be more advantageous to be used where the level of noise produced thereby is of importance.

This object is according to the invention obtained by providing such an electric machine with the features listed herein.

By the fact that said first channel portion and said second channel portion change the direction of the airflow leaving the fan twice the level of noise produced at high speeds will be reduced considerably by the direction change of the air causing acoustic waves generated by the function of the fan to be repeatedly reflected by said first and second walls before reaching the air outlet. This means that the need for using forced ventilation may be eliminated resulting in a lower product cost for the proper function of the electric machine, as well as less weight on train level when using such an electric machine in a railway vehicle due to removal of external fan and ducting. The removal of an external fan and ducting also provides more space, which may be used for instance by arranging a more powerful electric machine.

According to an embodiment of the invention the air outlet channel of said arrangement is configured to conduct air radially leaving the fan to escape through said air outlet symmetrically around a rotor axis. This feature has a favourable impact upon the cooling efficiency of the fan and the reduction of noise caused by the operation thereof.

According to another embodiment of the invention said end shield at the second axial end of the housing has peripheral portions pointing in the direction of said first axial end and providing said first walls of said first channel portion. This means that a silencer may be provided by the design of said arrangement without adding demand of axial space to the space required by the electric machine.

According to another embodiment of the invention walls of said first channel portion opposed to said first walls are formed by a stator frame or a prolongation of a stator frame of the electric machine, which has also a favourable influence upon space demanded for the electric machine.

According to another embodiment of the invention said first walls form with respect to a rotor axis a peripheral delimitation of the first channel portion at a distance from the rotor axis making the main part of the first channel portion located within a circular cylinder having the rotor axis as center axis and a stator frame forming the outer limitation of the stator as a radius. This means that the silencer obtained by the design of said arrangement will occupy a minimum or no radial space with respect to an electric machine having no such arrangement, so that the electric machine may be provided with a silencer without any extra space demanded thereby.

According to another embodiment of the invention said second walls of said second channel portion form an end of said first channel portion before this is reaching the stator body. This design of the first channel portion is favourable with respect to space required for the electric machine.

According to another embodiment of the invention said first walls of the first channel portion are designed to change the direction of the airflow radially leaving said fan by 70°-110°, 80°-100° or 90°. Such a direction change, especially in the order of 90°, will result in the reflection of acoustic waves and noise reduction aimed at.

According to another embodiment of the invention said second walls of said second channel portion are designed to change the direction of the airflow from the fan in said first channel portion when reaching the second channel portion by 70°-110°, 80°-100° or 90°. Such a second channel portion following upon the first channel portion will have an advantageous influence upon the reduction of noise obtained by how air is conducted through the air outlet channel to the air outlet.

According to another embodiment of the invention said air outlet channel has a third channel portion following upon said second channel portion and which is configured to redirect airflow arriving thereto through said second channel portion in an axial direction. Such a third channel portion will result in a further reduction of noise level and preferred to have in an electric machine to be arranged where the demand of noise reduction is extremely high. It may then be preferred to have said third channel portion extending from said second channel portion in the direction of said second axial end of the machine for not blowing the warm outlet air in the direction towards the air inlet of the housing.

According to another embodiment of the invention said air outlet channel extends to let air out from said housing through a said air outlet extending over the main part of the entire perimeter of the electric machine as seen in the axial direction thereof. This is favourable for obtaining an efficient cooling of the components of the machine arranged inside said housing.

The invention also relates to a track-bound vehicle electric machine according to the above. The advantages of an electric machine of this type are especially accentuated for the case of a track-bound vehicle electric machine as a consequence of the particular environment residing next to such a machine.

The invention also relates to a driving arrangement for a track-bound vehicle, which comprises an electric machine according to the above, as well as a use of an electric machine according to the above in a driving arrangement for generating a traction force of a track-bound vehicle.

Finally, the invention is also directed to a track-bound vehicle having a driving arrangement for generating a traction force of the vehicle including at least one electric machine according to the above. Such a track-bound vehicle may be operated at high power due to the efficient cooling obtained while keeping the noise level low of said electric machine resulting in high possible powers consumed/generated by the machine.

Further advantages as well as advantageous features of the invention will appear from the following description of embodiments of the invention.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
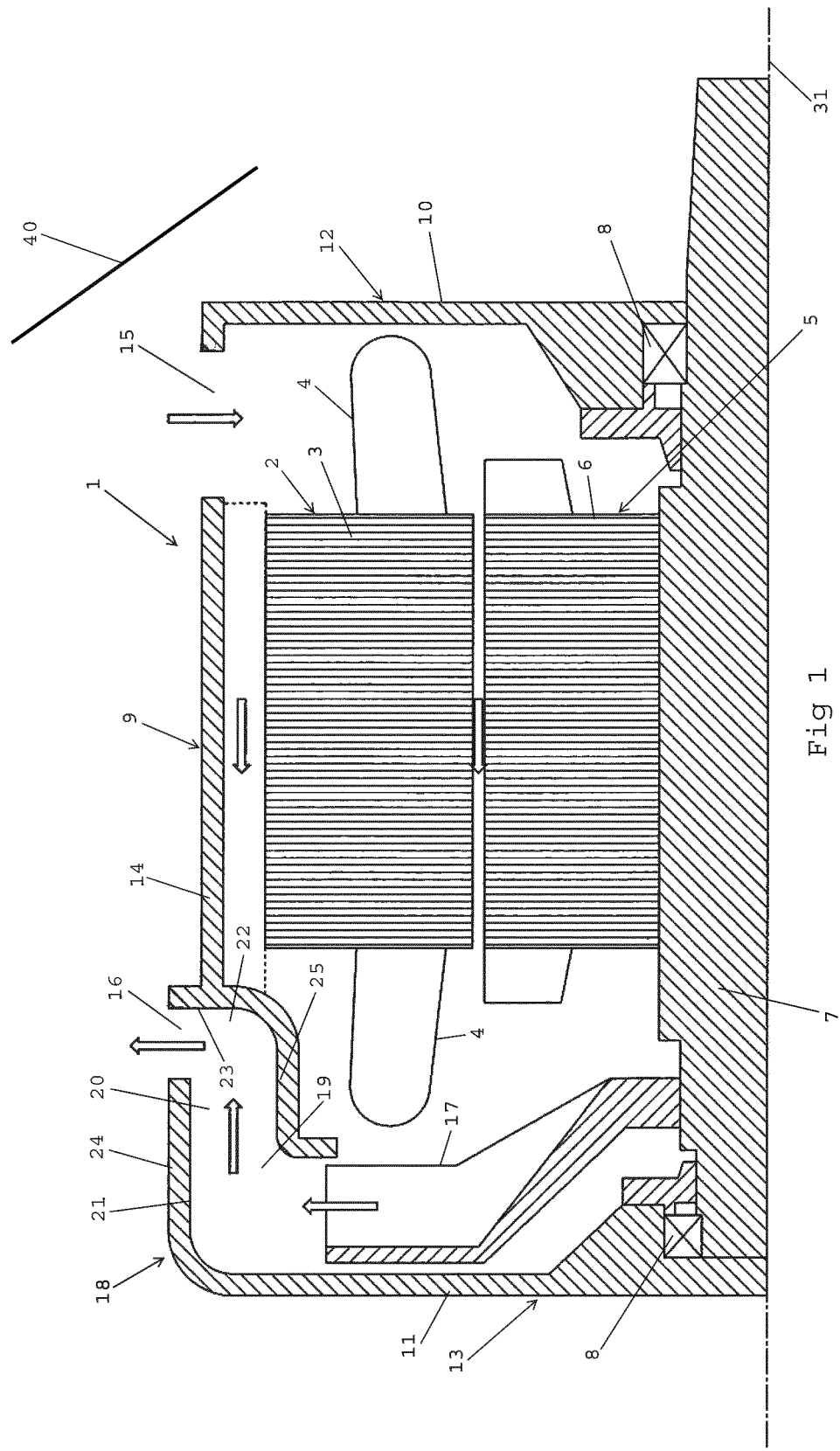
FIG. 1 is a very schematic cross section view of a half of an electric machine according to a first embodiment of the present invention.

FIG. 1 illustrates very schematically an electric machine 1 according to a first embodiment of the invention. It is indicated that the machine is arranged in a track-bound vehicle 40 and it has a stator 2 with a stator body 3 having a stator winding 4 configured to electrically create a plurality of stator poles disposed around the inner periphery of the stator body. A rotor 5 is rotatably disposed around a rotor axis 31 within the stator and has a rotor body 6. The rotor may be provided with permanent magnets or any other type of means, such as conducting loops, for electromagnetic induction interaction with the stator winding. It is shown how the rotor is secured to a rotor axle 7 in the form of a shaft received in bearings 8.

The electric machine has a housing 9 enclosing the rotor 5 and the stator body 3 with stator winding 4, and this housing comprises an end shield 10, 11 arranged at each axial end 12, 13 of the machine. The housing also comprises a stator frame 14 surrounding the stator body and the rotor.

The housing has a peripheral air inlet 15 at a first axial end 12 of the machine and a peripheral air outlet 16 at the other, second axial end 13 of the machine, which here means that air will escape through the outlet 16 symmetrically around the rotor axis 31. A fan 17 is fixed within the housing by being secured to the rotor axle 7 at said second axial end 13 to rotate with the rotor body so as to create a flow of air through the housing from the air inlet 15 to the air outlet 16 for cooling parts of the electric machine, especially the stator winding 4. Thus, the electric machine is self-ventilated, and the cooling air flow will increase with the rotational speed of the rotor axle.

An arrangement 18 with the aim to reduce noise emanating the rotation of the impeller of the fan 17 and the air flow produced thereby is configured to form an air outlet channel 19 conducting air radially leaving the fan to the air outlet 16. This arrangement comprises in a first channel portion 20 first upstreams walls 21 configured to direct air leaving the fan axially back in the direction of the first axial end 12 of the machine. The air outlet channel has a second channel portion 22 following upon the first channel portion 20 and which has second downstreams walls 23 configured to redirect the air flow from the fan by changing the direction thereof by 90° and accordingly in the radial direction. Thus, the air will leave the machine through the outlet 16 radially symmetrically with respect to the rotor axis 31 in this embodiment. It is the end shield 11 at the second axial end 13 that with peripheral portions 24 thereof pointing in the direction of the first axial end 10 that provides said first walls 21 of the first channel portion 20. Walls 25 of the first channel portion 20 opposed to the first walls 21 are formed by a prolongation of the stator frame 14 of the machine.

The result of this appearance of said arrangement 18 is as follows. Thanks to changing the direction of the air flow leaving the fan 17 twice, each time by in the order of 90°, a decrease of the pressure of the air in said flow and a reduction of the velocity of said air flow before reaching the air outlet 16 are obtained. The direction changes of the air flow obtained by the design of the air outlet channel result in a considerable noise reduction. Furthermore, the arrangement of said first walls 21 and second walls 23 gives rise to a reflection or bouncing of acoustic waves created by the fan several times against air channel walls before reaching the air outlet 16 having an additional noise level reduction influence upon the noise created by the fan. This is obtained without requiring any extra space axially or radially with respect to an electric machine having only a radial opening in the end shield for the air flow leaving the fan. Thus, components of the electric machine defining the maximum power which may be delivered by the machine have not to be reduced in size for obtaining this noise level reduction. A reduction of the level of noise created by the operation of the fan by in the order of 6 dB at 4 700 rpm of the machine has turned out to be achievable by the invention.

Figure 2:
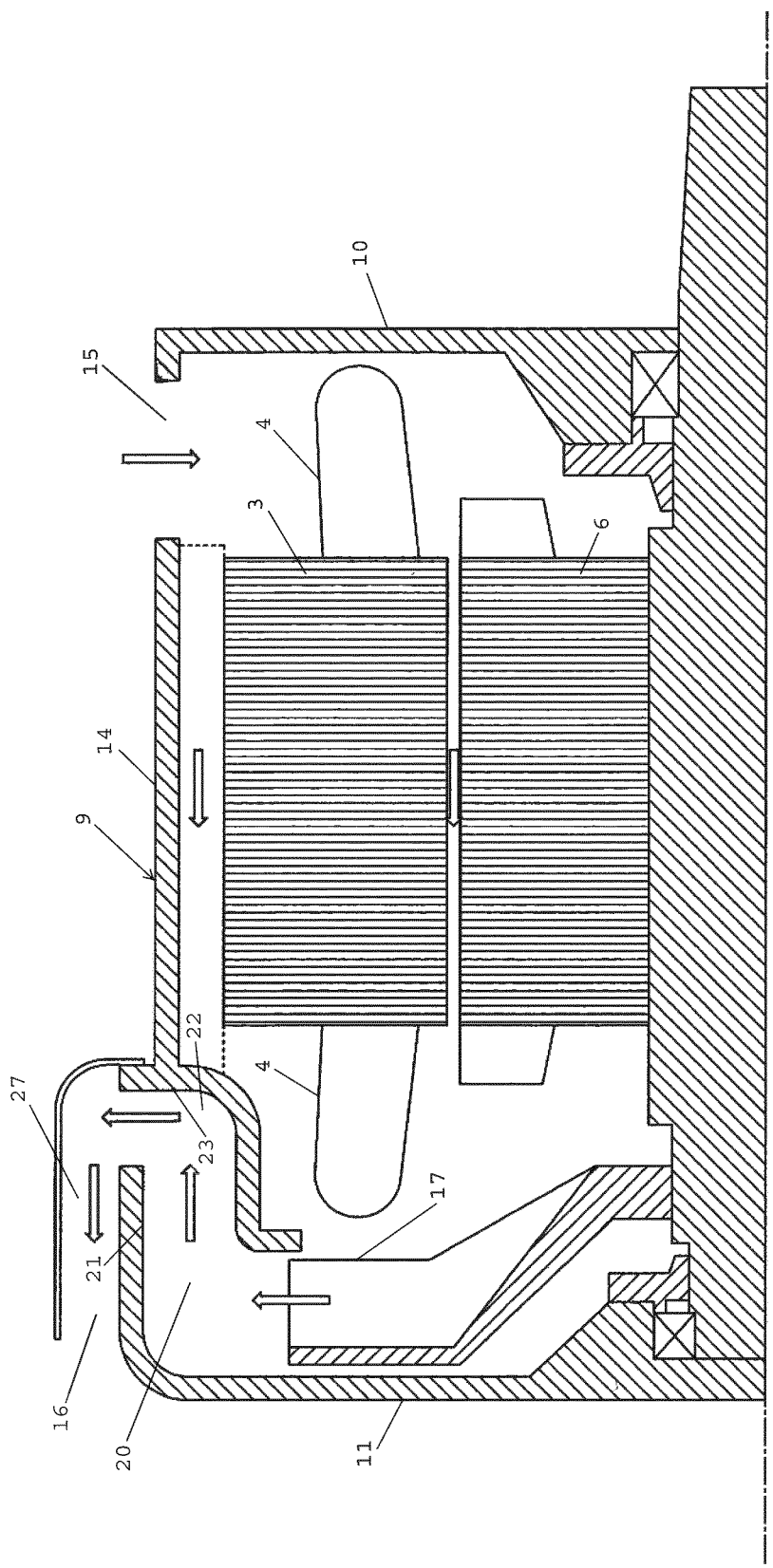
FIG. 2 is a view corresponding to FIG. 1 of an electric machine according to a second embodiment of the invention.
Figure 3:
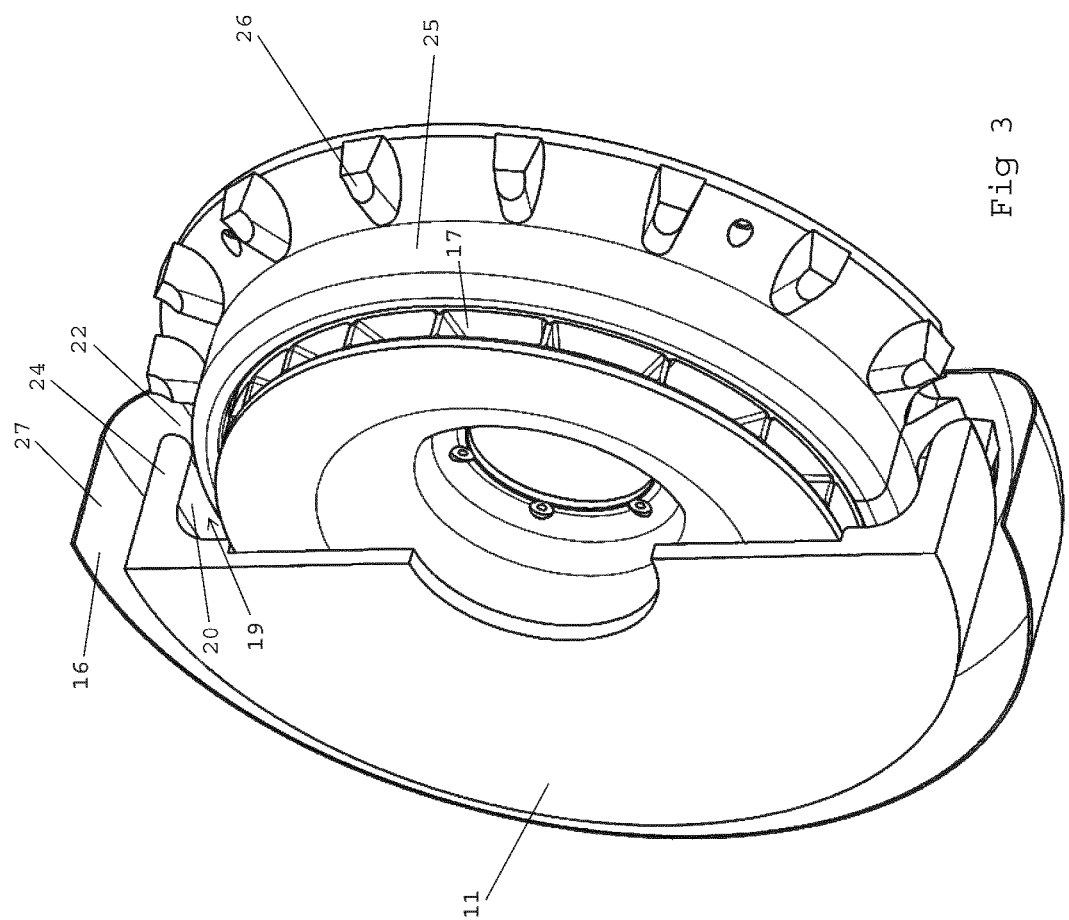
FIG. 3 is a perspective view of the fan end of the electric machine shown in FIG. 2 with parts of the end shield broken away for showing parts relevant for the present invention.

FIG. 2 illustrates an electric machine according to a second embodiment of the invention differing from the first embodiment by an arrangement of a third channel portion in the air outlet channel following upon the second channel portion 22 and which is configured to redirect air flow arriving thereto through the second channel portion 27 in an axial direction of the second axial end 13 of the machine. Thus, the air will leave the machine through the outlet 16 axially symmetrically with respect to the rotor axis 31 in this embodiment. This results in a further noise level reduction with respect to the first embodiment thanks to an increased bouncing of acoustic waves against channel walls, but it will axially occupy some more space. It would also be possible to let this third channel portion pointing in the opposite direction towards the first axial end 12 of the machine, although it would then be a slight risk that warm air will be drawn into the air inlet. Furthermore, it appears from FIG. 3 that the air outlet channel 19 and the air outlet 16 extend along the entire circumference of the electric machine except for being interrupted by shoulders 26 supporting the peripheral portions 24 of the end shield 11 and to which the end shield is secured and by that secured to the stator frame.

The invention is of course not in any way restricted to the embodiments described above, but many possibilities to modifications thereof will be apparent to a person with skill in the art without departing from the scope of the invention as defined in the appended claims.

The invention claimed is:

1. An electric machine, comprising:
    a stator (2) having a stator body (3) with a stator winding (4) configured to electrically create a plurality of stator poles disposed around the inner periphery of the stator body,
    a rotor (5) rotatably disposed within said stator and having a rotor body (6),
    a housing (9) enclosing at least said rotor (5), the stator body (3) and the stator winding (4) and comprising an end shield (10, 11) arranged at each axial end (12, 13) of the machine, said housing having
    at least one air inlet (15) at a first said axial end (12) of the machine, and
    at least one peripheral air outlet (16) at the other, second axial end (13) of the machine, and
    a stator frame (14) surrounding the stator body (3) and the rotor (5) and spaced from said stator body (3) to define a channel for cooling air flowing therebetween,
    a fan (17) fixed within the housing (9) at said second axial end (13) to rotate with the rotor body (6) so as to create a flow of air through said housing from said air inlet (15) to said air outlet (16) for cooling parts of the electric machine, and
    an arrangement (18) configured to form an air outlet channel (19) configured to conduct air radially leaving said fan (17) to said air outlet (16),
    wherein said arrangement comprises, in a first channel portion (20), a first wall (21) configured to direct air leaving said fan (17) axially back in the direction of said first axial end (12),
    in a second channel portion (22) following upon the first channel portion (20), a second wall (23) configured to redirect the air flow from the fan (17) to assume a major radial component of said redirected air flow in a direction substantially normal to air flow in said first channel portion (20) and through said outlet (16) and opposite to direction of air flow through said inlet (15), and
    a wall (25) of said first channel portion (20) opposite said first wall (21) is formed by said stator frame (14) radially inside said housing (9).

2. An electric machine according to claim 1, wherein the air outlet channel (19) of said arrangement is configured to conduct air radially leaving the fan (17) to escape through said air outlet (16) symmetrically around a rotor axis (31).

3. An electric machine according to claim 1, wherein said end shield (11) at the second axial (13) end of the housing (9) has peripheral portions (24) pointing in the direction of said first axial end (12) and providing said first wall (21) of said first channel portion (20).

4. An electric machine according to claim 1, wherein said first wall (21) form with respect to a rotor axis (31) a peripheral delimitation of the first channel portion (2024) at a distance from the rotor axis making the main part of the first channel portion (2021) located within a circular cylinder having the rotor axis (31) as centre axis and a stator frame (14) forming the outer limitation of the stator as radius.

5. An electric machine according to claim 1, wherein said second wall (23) of said second channel portion (22) form an end of said first channel portion (20) before reaching the stator body (3).

6. An electric machine according to claim 1, wherein said first wall (21) of the first channel portion (20) is designed to change the direction of the air flow radially leaving said fan (17) by one of: a range of 70°-110°, a range of 80°-100° or 90°.

7. An electric machine according to claim 1, wherein said second wall (23) of said second channel portion (20) is designed to change the direction of the air flow from the fan (17) in said first channel portion (21) when reaching the second channel portion (22) by one of: a range of 70°-110°, a range of 80°-100° or 90°.

8. An electric machine according to claim 1, wherein said air outlet channel (19) extends to let air out from said housing (9) through said air outlet (16) extending over the main part of the perimeter of the electric machine as seen in the axial direction thereof.

9. A track-bound vehicle electric machine according to claim 1.

10. A driving arrangement for a track-bound vehicle, wherein it comprises an electric machine (1) according to claim 9.

11. A track-bound vehicle having a driving arrangement for generating a traction force of the vehicle including at least one electric machine (1) according to claim 1.

12. An electric machine according to claim 1, wherein said fan (17) is situated within said housing (9) opposite both said rotor (5) and said stator (2).

13. An electric machine according to claim 1, wherein said first and second channel portions (20, 22) are both situated downstream of said rotor (5) and stator (2).

14. An electric machine according to claim 1, wherein said channel defined between said stator (2) and stator frame (14), and said first channel portion (20) are oriented to direct air flow in opposite directions.

15. An electric machine, comprising:
- a stator (2) having a stator body (3) with a stator winding (4) configured to electrically create a plurality of stator poles disposed around the inner periphery of the stator body,
- a rotor (5) rotatably disposed within said stator and having a rotor body (6),
- a housing (9) enclosing at least said rotor (5), the stator body (3) and the stator winding (4) and comprising an end shield (10, 11) arranged at each axial end (12, 13) of the machine, said housing having
- at least one air inlet (15) at a first said axial end (12) of the machine,
- at least one peripheral air outlet (16) at the other, second axial end (13) of the machine, and
- a stator frame (14) surrounding the stator body (3) and the rotor (5) and spaced from said stator body (3) to define a channel for cooling air flowing therebetween,
- a fan (17) fixed within the housing (9) at said second axial end (13) to rotate with the rotor body (6) to create a flow of air through said housing from said air inlet (15) to said air outlet (16) for cooling parts of the electric machine, and
- an arrangement (18) configured to form an air outlet channel (19) configured to conduct air radially leaving said fan (17) to said air outlet (16),
- wherein said arrangement comprises,
- in a first channel portion (20), a first wall (21) configured to direct air leaving said fan (17) axially back in the direction of said first axial end (12),
- in a second channel portion (22) following upon the first channel portion (20), a second wall (23) configured to redirect the air flow from the fan (17) to assume a major radial component of said redirected air flow in a direction substantially normal to air flow in said first channel portion (20) and opposite to direction of air flow through said inlet (15),
- a wall (25) of said first channel portion (20) opposite said first wall (21) is formed by said stator frame (14) radially inside said housing (9),
- said air outlet channel (19) has a third channel portion (27) following upon said second channel portion (22) and which is configured to redirect air flow arriving thereto through said second channel portion (22) in an axial direction away from said first axial end (12) and through said outlet (16).

16. An electric machine according to claim 15, wherein said third channel portion (27) extends from said second channel portion (22) in the direction of said second axial end (13) of the machine.

\* \* \* \* \*